United States Patent [19]
Wetteborn et al.

[11] Patent Number: 6,080,977
[45] Date of Patent: Jun. 27, 2000

[54] APPARATUS FOR CONCENTRATING SALT-CONTAINING SOLUTIONS WITH MICROWAVE ENERGY

[75] Inventors: Klaus Wetteborn, Troisdorf; Arnd Gutmann, Neuwied; Horst Linn, Eschenfelden; Jörg Wörner, Grosskrotzenburg; Wolfgang Theisen; Alfred Chrubasik, both of Hanau; Egbert Brandau, Alzenau, all of Germany

[73] Assignees: Nukem Nuklear GmbH, Alzenau; Linn High Term GmbH, Eschenfelden, both of Germany

[21] Appl. No.: 09/038,827

[22] Filed: Mar. 12, 1998

[30] Foreign Application Priority Data

Dec. 3, 1997 [DE] Germany .......................... 197 10 151
Dec. 3, 1997 [DE] Germany .......................... 197 10 157

[51] Int. Cl.⁷ ................. H05B 6/70; G21F 9/04
[52] U.S. Cl. ............ 219/695; 219/738; 219/746; 219/762; 219/704; 23/307
[58] Field of Search ................. 219/695, 696, 219/699, 738, 741, 745, 746, 750, 762, 704; 23/295 R, 307

[56] References Cited

U.S. PATENT DOCUMENTS

| | | | |
|---|---|---|---|
| 2,627,571 | 2/1953 | Hiehle et al. ............... | 219/699 |
| 2,820,127 | 1/1958 | Argento et al. ............ | 219/696 |
| 4,179,493 | 12/1979 | Sadan . | |
| 4,514,329 | 4/1985 | Wakabayashi et al. . | |
| 4,711,983 | 12/1987 | Gerling .................... | 219/746 |
| 4,940,865 | 7/1990 | Johnson et al. ........... | 219/738 |
| 5,237,152 | 8/1993 | Gegenwart et al. ...... | 219/695 |

FOREIGN PATENT DOCUMENTS

| | | |
|---|---|---|
| 0 343673 | 11/1989 | European Pat. Off. . |
| 2 424778 | 5/1974 | Germany . |
| 2 430445 | 6/1974 | Germany . |
| 2 822370 | 5/1978 | Germany . |
| 3 109513 | 3/1981 | Germany . |
| 3 200331 | 1/1982 | Germany . |
| 3 544270 | 12/1985 | Germany . |
| 4 023162 | 7/1990 | Germany . |
| 4 034786 | 11/1990 | Germany . |
| 4 122802 | 7/1991 | Germany . |
| 55-067326 | 5/1980 | Japan ...................... 219/695 |
| 58-115066 | 7/1983 | Japan . |
| 60-236099 | 11/1985 | Japan ...................... 219/695 |
| 63-190635 | 8/1988 | Japan . |

*Primary Examiner*—Philip H. Leung
*Attorney, Agent, or Firm*—Dennison, Scheiner, Schultz & Wakeman

[57] ABSTRACT

An apparatus for concentrating and solidifying a salt solution includes a vessel for containing the salt solution having an exposed surface, the vessel having a generally open upper portion, a cover for sealing the generally open upper portion of the vessel and having a generally hood shaped portion, the cover including at least one inlet conduit for admitting the salt solution to the vessel and a discharge conduit for vapor, and a magnetron for generating microwaves for heating the solution in the vessel. A microwave waveguide is disposed between the magnetron and the vessel and incorporates the cover, for directing microwaves from the magnetron into the vessel, the waveguide transitioning within the cover from the generally hood shaped portion into a horn having a variable cross-section and/or variable vertical spacing with respect to the vessel. This structure enables microwaves to be radiated directly onto the exposed surface of the salt solution in the vessel.

8 Claims, 1 Drawing Sheet

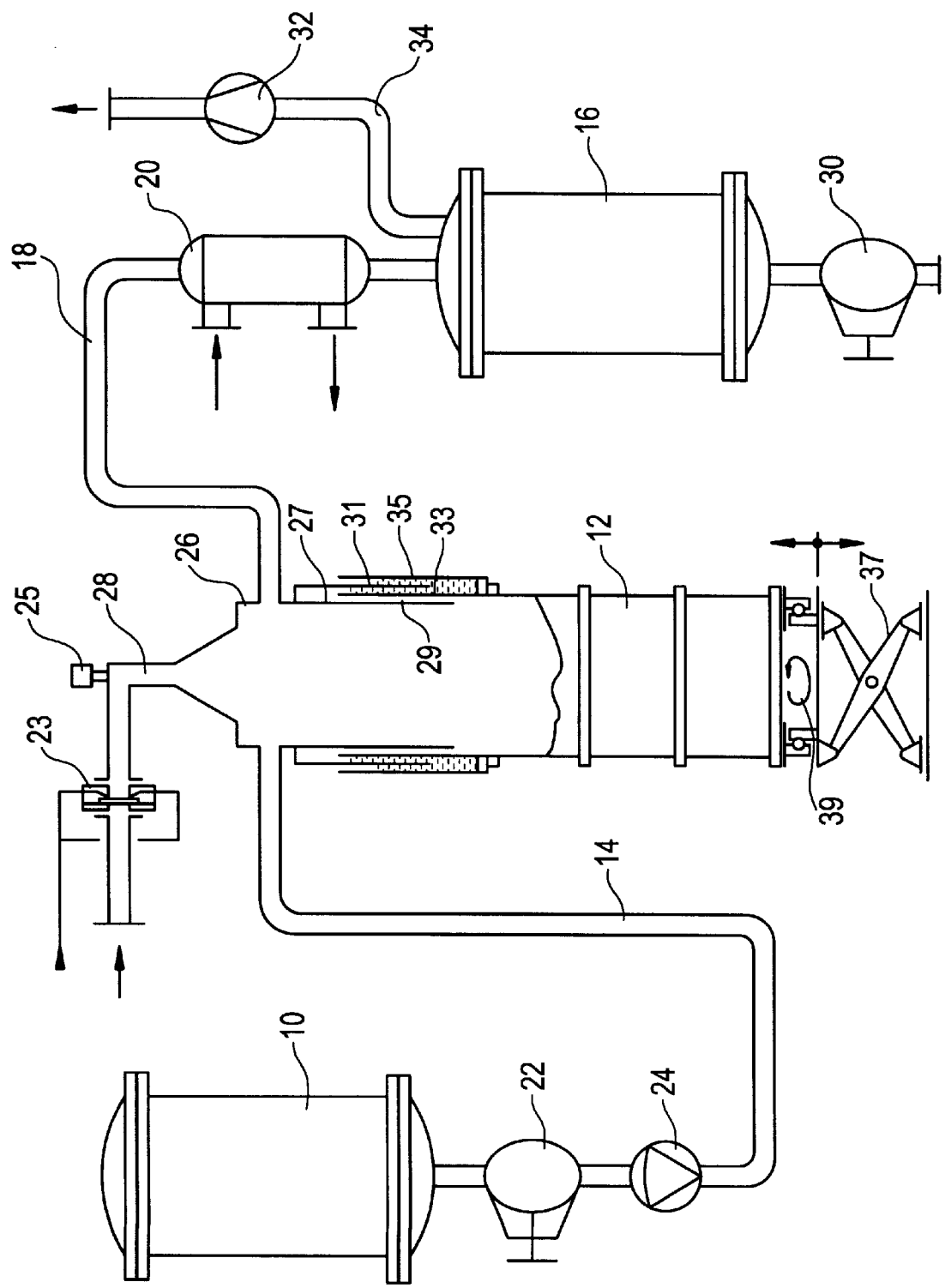

APPARATUS FOR CONCENTRATING SALT-CONTAINING SOLUTIONS WITH MICROWAVE ENERGY

BACKGROUND OF THE INVENTION

1. Field of the Invention

The invention refers to a method for concentrating and solidifying salt-containing solutions, in particular borate- or sulfate-containing solutions, in a sealed vessel under the action of heat by means of microwaves, the salt solution to be concentrated being fed into the container continuously or in batches, and liquid being evaporated and then preferably fed into a condensate vessel. The invention also refers to an apparatus for concentrating and solidifying salt-containing, for example borate-containing or sulfate-containing, solutions, comprising a heat source, a vessel sealable by means of a cover having at least one inlet conduit for the salt solution to be concentrated and solidified, and a discharge conduit.

2. Description of Related Art

A method and a device for drying contaminated liquids and solutions is known from DE 35 44 270 A1. In this, the liquid is dried by means of microwaves. To achieve high efficiency, it is proposed that the microwave energy be delivered during the drying operation such that the microwaves are phase-shifted in accordance with the particular fill level inside the vessel and with the varying absorption capability of the contents.

The known features yield the advantage that the heat treatment on the one hand, and the handling necessary therefor on the other hand, can be physically separated from one another, so that radioactive exposure for the operating personnel can be ruled out or greatly reduced.

It is also known to use an electrical heating system, surrounding a drum, for in-drum drying of liquid radioactive wastes (DE 40 53 162 A1, DE 32 00 331 C2). In order to improve the efficiency of the drying of liquid by means of microwave energy, DE 31 09 513 C2 provides for microwave energy-absorbing packing elements which are introduced into a tower reactor through which the liquid to be dried flows.

If it is desired to concentrate and solidify sulfate-containing salt solutions with the known methods, it is possible, for example, to introduce 100 kg of dry substance into a rolling hoop drum having a capacity of 200 liters, 55% water of crystallization being present. Since, in addition, such drums can often be only half filled or three-quarters filled, the actual number of volumes to be disposed of is large, and they require a great deal of room for storage.

EP 0 343 673 A1 discloses a method for producing sodium carbonate in which a heating operation in a temperature range between 32 and 35.3° C. is accomplished in order to reduce the water content. The heating operation can be accomplished by means of microwave energy.

According to U.S. Pat. No. 4,179,493, salt solutions are concentrated by means of direct radiation in the form of sunlight.

A method for solidifying liquid radioactive wastes which are converted into gels with the addition of a silicon solution is known from U.S. Pat. No. 4,514,329. According to JP 58-115066 A, radioactive waste product solutions, with the addition of Si and B compounds, are dried by means of microwaves, roasted, and melted to form synthetic materials.

Borate-containing solutions with pH values >5, usually in the alkaline range, occur in a number of chemical processes.

In the operation of pressurized water nuclear reactors, a variety of solutions are reduced in volume by means of a conventional evaporator. Concentrates occur which contain approximately 20 wt % salts, principally boron compounds.

These evaporator concentrates are then subjected to a solidification operation, i.e. are solidified in suitable receptacles, by means of external heating means preferably in the form of jacket heating systems, until the salts containing water of crystallization crystallize out. This evaporation takes place in a final storage receptacle.

The known methods, in which borate-containing solutions having toxic organic constituents such as oils, surfactants, and/or radioactive materials are to be solidified, yield solids in the form of salt blocks which often contain all of the water of crystallization. This means that, for example in the case of borax ($Na_2B_4O_4.10H_2O$), up to 47 wt % water is contained in the final product. In the case of dihydrated disodium tetraborate ($Na_2B_4O_7.2H_2O$), it means a 15 wt % water content.

SUMMARY OF THE INVENTION

The object on which the present invention is based is that of developing a method and an apparatus of the kind cited initially in such a way that salt-containing, in particular sulfate- or borate-containing, solutions can be concentrated and solidified with high efficiency; utilization of the vessel in which the salt solution is concentrated and solidified is to be optimum, while furthermore ensuring that the dry substance has a high density and is largely cavity-free.

With regard to the method, the object is substantially achieved, according to the invention, by the fact that the salt-containing solution is heated in the vessel, into whose cover opens a microwave waveguide which transitions into a horn whose cross section and/or spacing from the liquid surface of the solution can be modified such that the microwaves are radiated substantially directly onto the salt-containing solution.

The invention is characterized in particular by a method for concentrating and solidifying a solution containing sodium sulfate, having the following process steps:

feed the salt solution into the vessel, continuously or in batches; and heat the salt solution by means of microwaves, in such a way that the sodium sulfate which is present converts into thenardite, and settles out as a bottom deposit from the particular quantity of salt solution that is fed in.

In this context, the salt solution is concentrated in the vessel at a pressure p where p<1000 mbar, in particular at 900 mbar<p<1000 mbar, the temperature T being in particular T≧85° C., in particular 85° C.<T<120° C.

According to a development, the temperature at which the liquid evaporates can be lowered if the salt solution contains sodium chloride or if sodium chloride has been added.

As a development of the invention, it is proposed that the salt solution be heated such that sodium sulfate is converted locally into $\chi\text{-}Na_2SO_4$.

The invention exploits the property of sodium sulfate that different water of crystallization contents are present at various temperatures; concentration and solidification are accomplished at temperatures at which Glauber salt, which has a high water of crystallization content, is converted into thenardite without in turn requiring temperatures which require a high energy consumption and entail a risk that a nonuniform thenardite layer structure will form inside the vessel, which might in particular cause cavity inclusions to occur. This would otherwise undesirably decrease the density of the dry substance.

Dewatering of the sodium sulfate is additionally improved by the fact that sodium sulfate salts are locally heated to temperatures exceeding 250° C., resulting in anhydrous hexagonal $\chi$-$Na_2SO_4$ which upon further cooling is converted below 240° C. into rhombic $\beta$-$Na_2SO_4$, and below 180° C. into monoclinic $\alpha$-$Na_2SO_4$, which is unstable in aqueous solution, converts into rhombic thenardite, and settles in the vessel as a bottom deposit.

If the vessel is filled in batches, provision is made for the solution which contains the quantities of sodium sulfate to be concentrated and solidified to be fed in when the pressure present in the vessel corresponds approximately to that in the condensate vessel. This mutual pressure matching is an indication that the liquid in the solution has largely evaporated.

Preferably a 200-liter drum, in particular a rolling hoop drum, is used to concentrate and solidify the sulfate-containing solution, and a magnetron with an output of approximately 2 to 20 kW is used to generate the microwaves. In this context, the output can be variably adjustable to the fill level in the drum and/or the condition of the media present in the drum.

The salt solution itself should be fed into the vessel at a temperature $T_R$, in particular room temperature, or in the case of high salt contents, and in order to prevent crystallizing out, at a temperature $T_R$ of approximately 40° C. The salt solution is then to be heated in the vessel in such a way that its vapor leaving the vessel has a temperature of approximately 70 to 130° C., in particular 80 to 120° C. This temperature is to be determined in simple fashion in the vapor discharge conduit, so that simple regulation of the microwave output is possible. The temperature is measured at the beginning of the vapor discharge conduit (vapor line), i.e. directly at the vessel. If salt solution is being fed in batchwise, the temperature in the vapor line rises approximately continuously, but not steadily. When the temperature is approximately constant, new salt solution can be fed in. Infeed of the salt solution can thus be controlled on the basis of a measurement of the temperature profile (infeed when T=approx. constant).

A borate-containing solution, in particular, can be heated by means of microwaves in such a way that a temperature gradient forms from the interior of the solution outward, while at the same time water, water of crystallization, and/or, in the case of a conversion of ortho- or metaboric acid into $B_2O_3$, water released from boron compounds that have crystallized out, is evaporated. Preferably divalent and/or trivalent iron compounds are added to the borate-containing solution in order to increase the absorption of microwave energy.

In order to concentrate and solidify the borate-containing solution in energetically favorable fashion, provision is further made for the salt solution to be evaporated in the vessel at a pressure p where p<1000 mbar, in particular where 900 mbar<p<1000 mbar.

Particularly good results are obtained if heating of the solution is accomplished with microwaves of a frequency of approximately 2450 MHz, with an output of 2 to 20 kW for a generator producing the microwaves.

Alternatively, it is possible for heating of the solution to be accomplished with microwaves of a frequency of approximately 915 MHz, with an output of 7 to 75 kW for a generator producing the microwaves.

At these outputs and frequencies, the pressure in the receptacle in which the solutions are evaporated should preferably be in the range between 20 and 100 mbar below standard pressure.

The quantity of microwave energy delivered to the solution should moreover be such that with a pressure in the vessel of approximately 900 to 1000 mbar absolute, an evaporation rate of 4 to 30 l/h, in particular 15 to 25 l/h, is established.

The method according to the invention is characterized in particular, on the one hand by the solidification of borate-containing solutions having toxic organic constituents such as oils or surfactants and/or radioactive substances, and on the other hand by the following process steps:

introduce the borate-containing solution into a vessel;

establish a pressure in the vessel in the range between 20 and 100 mbar below standard pressure;

evaporate water substantially completely by means of microwaves;

at least partly melt, by means of microwaves, the salt that has crystallized out.

According to the invention, concentration of borate-containing solutions is accomplished by heating with microwaves, preferably of a frequency of 2450 MHz or 915 MHz, the heat being introduced directly into the solution to be evaporated. This results in a heat flow from the interior of the solution outward, i.e. both the water to be evaporated and the evaporated water of crystallization flow in the same direction as the heat flow. The heat flow is not opposite to the evaporation flow.

Dewatering of the borate-containing solution can be continued, by the delivery of microwave energy, to the point that even the water of crystallization of disodium tetraborate is completely removed. It is also possible, by means of the teaching of the invention, to convert orthoboric acid into boron trioxide.

Divalent and/or trivalent iron compounds increase the delivery of microwave energy, and thus cause even the smallest residual quantities of water or water of crystallization to be evaporated with no need for a greatly elevated temperature.

The evaporation of water, i.e. both the water of the aqueous solution and the water of crystallization, should be accomplished in a vessel in which a pressure of approximately 900 to 1000 mbar absolute is present. The generators producing the microwaves should be designed for an output between 2 and 20 kW at a microwave frequency of 2450 MHz, or for an output between 7 and 75 kW at a frequency of 915 MHz.

The solution to be concentrated can be fed into the vessel both continuously and in batches. In this context, the quantity of salt solution to be concentrated is, in particular, fed into the vessel in batches when the pressure in the vessel corresponds approximately to that of the condensate vessel. Batchwise infeed of the salt solution can alternatively be controlled by measuring the temperature of the vapor leaving the vessel. When the temperature remains constant or approximately constant after previously rising in nonlinear fashion, new solution is fed in, since the solution admitted previously has evaporated.

According to a further significant proposal of the invention, after each drying operation the dry salt layer is covered (i.e. sealed) with a water-insoluble material such as a gel, so as to protect the salt solution from the penetration of water before the next batch is fed in.

An apparatus in particular for performing the above-described method for concentrating and solidifying salt-containing, for example sulfate- or borate-containing, solutions, comprises a magnetron for generating microwaves; a microwave waveguide downstream therefrom; a vessel, sealable by means of a hood-shaped cover, having at least one inlet conduit for the salt solution to be concentrated and solidified; and a discharge conduit, the microwave waveguide transitioning, in the region of the cover, into a horn whose cross section and/or spacing from the liquid surface of the solution can be varied in such a way that the microwaves can be radiated substantially only directly onto the salt solution.

These features prevent the formation of a "mountain" in the center region of the drum, which would otherwise negatively influence the homogeneity of the dry substance.

The microwave energy is also distributed very uniformly over the cross section of the drum by lowering and rotating the drum during the concentration operation.

The waveguide itself can also be guided through a hood-shaped cover of the vessel; the cover can have on the inside a protective coating and/or a spray shield, so that one and the same cover can be used for different drums in which boron-containing solutions are to be concentrated and solidified.

In an embodiment, provision is made for the cover, for example a diffuser, and the vessel to be sealed in gas-tight and microwave-tight fashion at the edges by means of a liquid-filled labyrinth seal. The vessel can be arranged rotatably on an adjustable-height arrangement such as a lifting platform.

According to a development, provision is made for a microwave window, protected by air or inert-gas purging, to be arranged in the waveguide leading to the diffuser.

In particular, the temperature inside the drum and the negative pressure therein during concentration and solidification of a sulfate-containing solution is to be established so as to result in a layered structure of thenardite, Glauber salt, and water, such that successively the water is evaporated and Glauber salt is converted into thenardite. This yields a dry substance in the form of a homogeneous salt block whose volume can occupy 90 to 95% of the drum itself, the water content being less than 0.5%. It is important to ensure, in this context, that the layer of Glauber salt and water is smaller than the maximum penetration depth of the microwaves.

Further details, advantages, and features of the invention are evident not only from the claims, the features indicated therein—per se and/or in combination—but also from the description below of preferred exemplifying embodiments.

EXAMPLE 1

An aqueous solution with 8.00 kg $Na_2B_4O_7.10H_2O$, 6.30 kg $H_3BO_3$, 970 g $FeSO_4.7H_2O$, 1.80 kg $Na_3PO_4.12H_2O$, 5.50 kg $Na_2SO_4$, and 1.50 kg diatomaceous earth, brought up to a volume of 100 l and having a pH of 7 to 7.5, was acted upon by microwave energy in a rolling hoop drum. The frequency was 2450 MHz. The generator producing the microwaves was set to an output of 12 kW. In addition, a pressure approximately 20 mbar below standard pressure was established in the vessel receiving the solution. With these parameters, water evaporation rates of 15.4 l/h resulted. A solid, cavity-free salt block with a density of 2.3 g/cm³ was obtained as a result.

EXAMPLE 2

A solution corresponding to Example 1 was acted upon by microwaves of the same frequency, but with the generator at an output level of 20 kW. At the initiation of evaporation, evaporation rates of 24.3 l/h were obtained. After evaporation was complete, i.e. when perceptible evaporation rates or a temperature change could no longer be ascertained in a vapor line proceeding from the vessel, microwave action on the crystallized-out solid was continued for a period of 16 hours. The result was a glass-like molten product whose density was 2.4 g/cm³.

EXAMPLE 3

A solution corresponding to Example 1 was acted upon by microwaves with a frequency of 915 MHz, the generator being set to an output of 35 kW. The solid salt block present after evaporation had a density of 2.28 g/cm³.

EXAMPLE 4

The solution concentrated as defined in Example 3, i.e. the salt block, was subjected to further microwave action for a total period of 12 hours after completion of evaporation. The result was a glass-like end product with a density of 2.43 g/cm³.

EXAMPLE 5

2 kg $Fe_2(SO_4)_3$ was added to the solution described in Example 1. The solution was then acted upon by microwaves with a frequency of 2450 MHz, which had been produced by a generator having an output of 12 kW. A pressure of approximately 900 mbar was generated in the vessel itself. A partly molten salt block of a density of 2.4 g/cm³ was obtained as the end product.

EXAMPLE 6

An aqueous solution with 10 kg $Na_2B_4O_7.10H_2O$, 6.30 kg $H_3BO_3$, 970 g $FeSO_4.7H_2O$, 1.80 kg $Na_3PO_4.12H_2O$, 1.50 kg diatomaceous earth, and 2 kg $K_2Cr_2O_7$, brought up to a volume of 100 l, was introduced into a roller hoop drum and acted upon by microwaves. The frequency was 2450 MHz, and the output of the magnetron used was 12 kW. The result, after evaporation, was a solid salt with a density of 2.6 g/cm³. Water content was 0.8 wt %.

EXAMPLE 7

A solution as described in Example 6, with the addition of 0.5 kg CsCl but without the $K_2Cr_2O_7$, was solidified under the experimental conditions of Example 1. The result was a solid salt block with a density of 2.5 g/cm³.

EXAMPLE 8

0.8 kg $SrSO_4$ was added to a solution with the composition defined in Example 7, and then heated according to the operating parameters of Example 1. The salt block obtained was almost anhydrous (0.7 wt %), and exhibited no cavities. The density was determined to be 2.38 g/cm³.

EXAMPLE 9

In order to ascertain the extent to which the water of crystallization content was influenced by the output of the magnetron generating the microwaves, a solution as described in Example 5 was introduced into a vessel in which a pressure of 250 mbar was then established. Microwaves at a frequency of 2450 MHz were input via a waveguide. The output of the magnetron, however, was only 6 kW. These experimental parameters yielded a salt block having a water content of 7 wt %. This means that the principal constituent, $Na_2B_4O_7$, still contained, by calculation, almost 1 water of crystallization, i.e. of 10 molecules of water of crystallization, approximately nine were removed.

EXAMPLE 10

In order to ascertain the extent to which the transfer of microwave energy into the solutions can be influenced as a function of additives to the solution, 2 kg $Fe_3O_4$ was added to a solution with the composition defined in Example 9, which was then treated according to the experimental parameters of Example 9. The result was a solid salt block with a water content of 0.5 wt %. Addition of the iron compound thus caused the microwave energy to be absorbed better, so that even residual quantities of water were evaporated off.

EXAMPLE 11

A solution with 14 kg $H_3BO_3$, 1 kg $Na_2B_4O_7 \cdot 10H_2O$, 2 kg $Na_2PO_4 \cdot 12H_2O$, 0.7 kg $SrSO_4$, 0.5 kg CsCl, 2 kg diatomaceous earth, and 0.5 kg nonionic surfactants, brought up to a volume of 100 l with water, was concentrated using a microwave energy of 16 kW at a pressure of 900 mbar. The result was a water evaporation rate of 19.8 l/h and a solid, partly molten block with a density of 2.39 $gcm^3$.

EXAMPLE 12

An aqueous solution with 20 wt % $Na_2SO_4$ was introduced continuously into a 200-liter rolling hoop drum and acted upon by microwaves generated by a magnetron with an output of 6 kW. The rolling hoop drum could be sealed with a hood- or dome-shaped cover, through which the salt solution was introduced into the drum and the evaporating water was carried off. In the drum itself, a pressure of 20 to 100 mbar below standard pressure was established. With these parameters, it was possible to achieve water evaporation rates of 7 to 8 l/h. After the rolling hoop drum had been completely filled, it was filled with 450 kg sodium sulfate. The water content of the salt block was less than 0.5 wt %. The density itself was 2.35 $g/cm^3$. It was observed that the salt block was uniform and had formed without cavities.

EXAMPLE 13

An aqueous solution with 15 wt % $Na_2SO_4$ and 3 wt % $K_2Cr_2O_7$ was exposed to microwave energy in accordance with Example 1, a pressure of 900 to 1000 mbar absolute having been established in the vessel. At steady water evaporation rates of 7 to 8 l/h, the result was a solidified salt block with a density of 2.48 $g/cm^3$. The salt block itself was cavity-free.

EXAMPLE 14

Using the process parameters of Example 1, an aqueous solution with 17 wt % $Na_2SO_4$ and 0.5 wt % vanadium(IV) chloride oxide was concentrated and solidified. The result was a salt block with a water content of 0.6 wt % and a density of 2.38 $g/cm^3$.

EXAMPLE 15

An aqueous solution with 4 wt % NaCl, 5.8 wt % $Na_2SO_4 \cdot 10H_2O$, 3.7 wt % $Na_3PO_4 \cdot 12H_2O$, 6.4 wt % $FeSO_4 \cdot 7H_2O$, 0.3 wt % $CaSO_4 \cdot 2H_2O$, 0.8 wt % diatomaceous earth, 0.3 wt % $Al_2O$, 3.2 wt % KOH, 1.6 wt % oxalic acid, and 1.6 wt % citric acid was concentrated by analogy with Example 1. The result was a solid salt block without cavities or cracks, with a water content of 0.3 wt %. The organic constituents (oxalic acid and citric acid) were destroyed.

EXAMPLE 16

A solution correspond to Example 4, of the same composition and with 0.01 wt % CsCl and 0.01 wt % $SrSO_4$ added, was evaporated and solidified at a microwave output of 6 kW, a pressure in the receptacle between 900 and 1000 mbar absolute, and water evaporation rates of 7 to 8 l/h. The result was a uniform, cavity-free, almost anhydrous salt block.

EXAMPLE 17

A aqueous solution with 16 wt % $Na_2SO_4$ and quantities of surfactants (approx. 3 wt %), complexing agents such as EDTA and NTE (approx. 1 wt %), strontium, cobalt, and cesium salts (approx. 1 wt % each), and 10 wt % iron(III) chloride, was treated as defined in Example 1. The result again was a solid, cavity-free salt block with a water content<1 wt %.

BRIEF DESCRIPTION OF THE DRAWINGS

The sole drawing FIGURE of is a schematic diagram of the apparatus according to the invention.

DESCRIPTION OF THE PREFERRED EMBODIMENTS

An apparatus with which the method according to the invention for concentrating and solidifying salt-containing, for example sulfate- or borate-containing, solutions can be carried out, is evident from the single FIGURE. This depicts, in purely schematic fashion, a feed tank 10, a conduit 14 leading to a vessel 12, and a condensate vessel 16, which is connected to vessel 12 via a conduit 18 in which, in turn, a condenser 20 is arranged. Feed tank 10 has a shutoff valve 22 and, downstream therefrom, a conveying pump 24 by means of which the salt solution to be evaporated and solidified is fed out of feed tank 10 via conduit 14 to vessel 12, preferably in the form of a roller hoop drum 12 with a capacity of 200 liters. A microwave waveguide 28, by means of which microwaves are input into vessel 12 from a magnetron (not depicted), terminates in the region of a basically dome- or hood-shaped cover 26, preferably configured in the form of a diffuser 27. Microwave waveguide 28 transitions into a horn 29 whose cross section and distance from the liquid surface in vessel 12 can be modified. Modifiability is preferably achieved by the fact that the height of vessel 12 is adjustable.

It is also evident from the single FIGURE that cover 26 and horn 29 are continuous with one another, i.e. cover 26 and horn 29 form one unit.

In order to radiate the microwaves substantially onto the liquid surface and not onto the vessel walls, provision is made for vessel 12, containing the solution to be evaporated, to be configured adjustably as to height and preferably rotatably. For this, the vessel is sealed, by means of a liquid-filled labyrinth seal, with respect to diffuser 27 that seals off vessel 12 at the top and consequently performs the function of cover 26. Diffuser 27 additionally causes the microwave radiation to be uniformly spread onto the surface of the salt solution.

Diffuser 27 and vessel 12 have at their ends walls 29, 31 and 33, 35 running concentrically with one another, outer wall 31 of diffuser 27 running between walls 33, 35 of vessel 12. Conversely, inner wall 33 of vessel 12 extends between walls 29, 31 of diffuser 27. The space running between walls 33, 35 is filled with a liquid, so that the necessary sealing between vessel 12 and diffuser 27 is guaranteed. The height of vessel 12 with respect to diffuser 27 can thus be adjusted, preferably by means of a pantograph table 37, vessel 12 being rotatable about its longitudinal axis (indicated by arrow 39) by means of a drive (not depicted in further detail).

This ensures that the microwaves arrive directly onto the liquid surface, and not first onto the inner walls of vessel 12. Because the microwave cone uniformly covers the entire surface of the liquid, formation of a "mountain" in the center region is reliably prevented.

Also located in waveguide 28 is a plasma detector 25 which shuts down the magnetron if plasma should form in the direction of waveguide 28.

In addition, there is located in microwave waveguide 28, upstream from diffuser 27, a microwave window 23 which is protected from vapor by an air or inert-gas purge, purging being accomplished in such a way that the vapor cannot pass into the region of waveguide 28 in which microwave window 23 is located. Instead, the gas protecting the microwave window, for example the inert gas, is aspirated out of waveguide 28 without allowing vapor to penetrate into the section.

Liquid infeed conduit 14 and vapor discharge conduit 18 also open into diffuser 27, which is joined in gas-tight and microwave-tight fashion to vessel 12 by means of the labyrinth seal or immersion seal constituted by wall sections 29, 31, 33, 35, running concentrically to one another, of diffuser 27 and vessel 12, respectively. As a result, one and the same diffuser 27 can be used for different vessels with no need for complex retooling. Condensate vessel 16 can be sealed off at the bottom by means of a valve 30 so as to drain off condensate that has accumulated in the requisite quantity.

The requisite negative pressure both in condensate vessel 16 and, in particular, in vessel 12 as well, is generated by means of a pump 32 which is arranged in a conduit 34 proceeding from condensate vessel 16.

For a drum 12 having a capacity of 200 l, the microwave output of the magnetron should be at least 6 kW in order to achieve, for a pressure inside vessel 12 of approximately 800 to 1000 mbar absolute, a water evaporation rate of 7 to 8 l/h; the vapor temperature measured in conduit 18 should be between 80 and 120° C. Higher evaporation rates can be achieved with magnetrons that possess up to 20 kW of output (e.g. 25 l/h at 20 kW). If these parameters are maintained, a sulfate-containing solution to be evaporated and solidified can be heated to a temperature of approximately 40 to 60° C., thus ensuring that a growing bottom layer of thenardite forms in vessel 12. Initially located above the thenardite layer is first Glauber salt and then water. With further evaporation, the Glauber salt is then converted into thenardite and the water thus released is evaporated.

What is claimed is:

1. An apparatus for concentrating and solidifying a salt solution comprising:

a vessel for containing the salt solution having an exposed surface, the vessel having a generally open upper portion;

a cover for sealing the generally open upper portion of the vessel and comprising a generally hood shaped portion, said cover including at least one inlet conduit for admitting the salt solution to the vessel and a discharge conduit for vapor;

a magnetron for generating microwaves for heating the solution in the vessel; and a microwave waveguide disposed between the magnetron and the vessel and incorporating the cover, for directing microwaves from the magnetron into the vessel, the waveguide transitioning within the cover from the generally hood shaped portion into a horn having a variable cross-section and/or variable vertical spacing with respect to the vessel, enabling thereby microwaves to be radiated substantially only directly onto the exposed surface of the salt solution in the vessel.

2. The apparatus of claim 1, wherein the cover is configured as a diffuser, the apparatus additionally comprising means for rotating the vessel and/or means for raising and lowering the vessel.

3. The apparatus of claim 1, additionally comprising a labyrinth seal between the cover and the vessel.

4. The apparatus of claim 1, additionally comprising a lifting platform for raising and lowering the vessel, and means for rotating the vessel.

5. The apparatus of claim 1, wherein the waveguide comprises a microwave window including means for gas purging.

6. The apparatus of claim 5, additionally comprising a plasma detector arranged in the waveguide between the microwave window and the cover.

7. The apparatus of claim 1, wherein the horn comprises a rectangular cross-section.

8. The apparatus of claim 1, additionally comprising a condensate container connected to the discharge conduit, and a pump for reducing pressure in the condensate container and the vessel.

* * * * *